United States Patent [19]

Bauer

[11] 3,712,321

[45] Jan. 23, 1973

[54] LOW LOSS VORTEX FLUID AMPLIFIER VALVE

[75] Inventor: Andrew B. Bauer, Orange, Calif.

[73] Assignee: Philco-Ford Corporation, Philadelphia, Pa.

[22] Filed: May 3, 1971

[21] Appl. No.: 139,599

[52] U.S. Cl. ................................ 137/81.5
[51] Int. Cl. .............................. F15c 1/16
[58] Field of Search ...................... 137/81.5

[56] References Cited

UNITED STATES PATENTS

| 3,515,158 | 6/1970 | Utz | 137/81.5 |
| 3,413,995 | 12/1968 | Bowles et al. | 137/81.5 |
| 3,563,260 | 2/1971 | Ellis | 137/81.5 |
| 3,592,213 | 7/1971 | Smith | 137/81.5 X |

Primary Examiner—William R. Cline
Attorney—Robert D. Sanborn

[57] ABSTRACT

A low loss fluid amplifier valve comprising a vortex chamber having axially aligned inlet and outlet ports, and a disk axially aligned therewith in the chamber. The disk is interposed between the ports, and includes radially extending vanes on surface portions thereof facing the inlet port. A pair of tangentially-directed control fluid injection ports are located to the side of the disk facing the outlet port, and are spaced radially of the chamber intermediate its axis and its peripheral curved wall. Introduction of tangential control flow into the vortex chamber effectively shuts off flow through the valve, with control fluid leaking from the valve's outlet port in only minimal amount, and flowing radially inwardly, in a reverse direction, from the vortex chamber to pass back through the inlet port.

11 Claims, 6 Drawing Figures

PATENTED JAN 23 1973
3,712,321
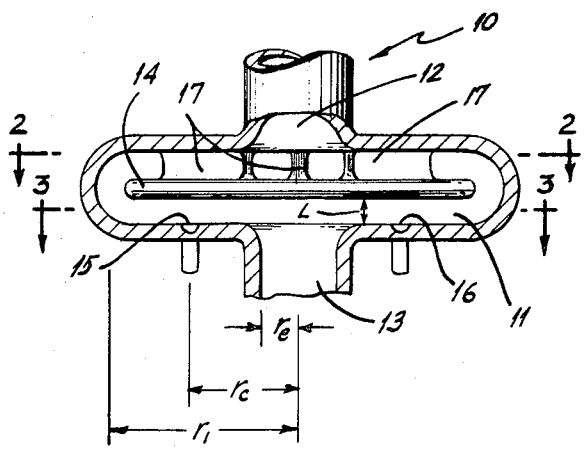
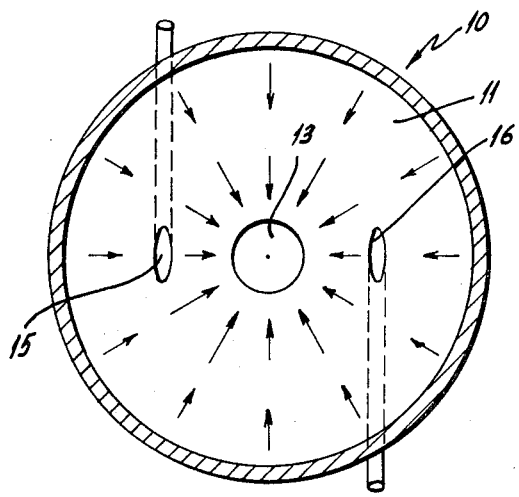
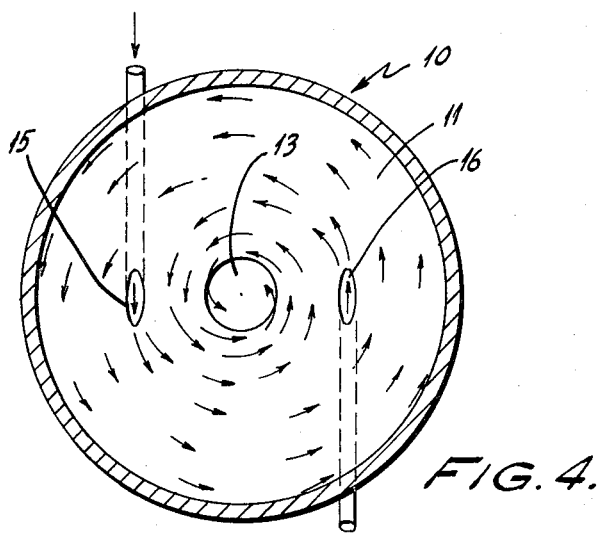
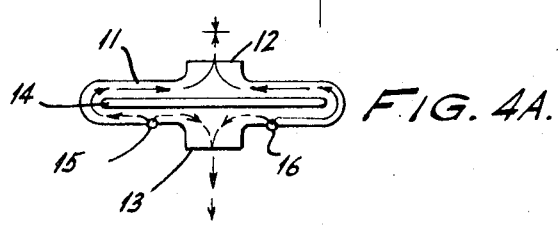
INVENTOR.
ANDREW B. BAUER
BY
Harry W. Harris III
AGENT

LOW LOSS VORTEX FLUID AMPLIFIER VALVE

BACKGROUND OF THE INVENTION

In fluid flow control apparatus utilizing a valve of the type known as a vortex fluid amplifier it is desirable in a number of instances substantially to eliminate control fluid leakage from the valve's outlet port during its "off" mode of operation. For example, when the outlet port feeds a thrust nozzle it is important that the valve effectively close off the nozzle in the "off" mode. Conventional vortex fluid amplifier valves in their "off" modes generally do not afford such precise operation, since control fluid inherently leaks freely through the valve—s outlet port with resultant undesired thrust.

It is an objective of my invention to provide an improved vortex fluid amplifier valve of simple and economical construction which, when in its "off" mode of operation, will direct flow of control fluid from the inlet port of the valve in such quantity as virtually to eliminate its leakage from the outlet port.

SUMMARY OF THE INVENTION

In achievement of the foregoing as well as other objectives, the invention contemplates an improved vortex fluid amplifier valve of the type having axially aligned inlet and outlet ports, and means defining a disk axially aligned therewith in the vortex chamber. Improvement resides in disposition of: tangentially-directed injection ports located radially intermediate the axis and the peripheral curved wall of the chamber, between the outlet port and the side of the disk facing the outlet port; and radially-extending vanes interposed between the inlet port and the side of the disk facing the inlet port.

The cooperative disposition of the vanes, the disk, the injection ports, the inlet port, and the outlet port is such that in the absence of control fluid flow through the injection ports, the main fluid flow will pass freely through the valve, entering by the way of the inlet port and leaving by way of the outlet port. Upon selective introduction of control fluid into the valve by way of the injection ports, a swirling flow pattern is created in the vortex chamber of the valve, centrifugally producing a pressure gradient in the radial direction, thereby substantially reducing the outflow-inducing fluid pressure near the valve's outlet port. A major portion of the control fluid flows in the reverse direction from the valve, by way of its inlet port, shutting off fluid that would normally enter the valve and effectively preventing fluid leakage from the outlet port of the valve.

The manner in which the foregoing as well as other general objectives may best be achieved will be more fully understood from a consideration of the following description, taken in light of the accompanying drawing.

BRIEF DESCRIPTION OF THE DRAWING

FIG. 1 is a sectional view of a vortex fluid amplifier valve embodying the invention;

FIG. 2 is a sectional view of the valve illustrated in FIG. 1, as seen looking in the direction of arrows 2—2 applied thereto;

FIG. 3 is a sectional view taken generally in the plane indicated by arrows 3—3 applied to FIG. 1, and illustrating, by means of fluid-flow arrows, an operational feature of the valve;

FIG. 3A is a somewhat diagrammatic showing of the valve as seen in FIG. 1, and illustrates the fluid flow pattern through the valve, augmenting the partial flow pattern seen in FIG. 3;

FIG. 4 is a sectional view similar to FIG. 3, and illustrating a further operational feature of the valve; and FIG. 4A is a showing of the valve similar to FIG. 3A, and illustrates the flow blocking pattern of the valve, augmenting the partial flow pattern seen in FIG. 4.

DESCRIPTION OF THE PREFERRED EMBODIMENT

With more detailed reference to the drawing, there is seen in FIGS. 1 and 2 a vortex fluid amplifier valve 10 comprising a vortex chamber 11 provided with axially aligned main fluid inlet port 12 and outlet port 13, and a disk 14 both axially aligned with and spaced intermediate ports 12 and 13. Tangentially directed control fluid injection ports 15 and 16 are located in the wall of chamber 11, and it is an important feature of the invention that these ports are disposed intermediate the axis and the peripheral curved wall of the chamber, between outlet port 13 and the side of disk 14 facing outlet port 13. Also, they are positioned to direct control fluid with slight angularity (note elliptical shapes, FIGS. 3 and 4) to the confronting side of the disk. Radially extending vanes 17 are interposed between inlet port 12 and the side of disk 14 facing the inlet port, and in the present embodiment serve as support means for the disk within the chamber.

In operation, and with reference also to FIGS. 3 and 3A, in the absence of control fluid flow through injection ports 15 and 16, main fluid flow will pass freely through valve 10, entering by way of inlet port 12, flowing between vanes 17, around disk 14 through the annular space between the curved periphery of the disk and the curved wall of chamber 11, thence outwardly of the valve through outlet port 13.

Upon selective introduction of control fluid into the valve by way of injection ports 15 and 16, and as illustrated by full line flow arrows in FIG. 4 and by broken line flow arrows in FIG. 4A, a swirling flow pattern is created in vortex chamber 11 (FIG. 4). This flow pattern centrifugally produces a fluid pressure gradient in the chamber, in a radial direction. This pressure gradient characteristically ranges from a reduced, outflow-inducing fluid pressure near the valve's outlet port 13 and an increased fluid pressure in the region of the annular fluid passage defined by the space between the rim of disk 14 and the side wall of chamber 11. Vanes 17 interfere with the swirling flow in the upper portion of vortex chamber 11, causing deceleration of the swirling fluid accompanied by a decrease in centrifugally induced pressure. This change in pressure is sufficient to cause a major portion of the control fluid to flow in the reverse direction from valve 10, by way of inlet port 12, whereas the reduced pressure in the region of outlet port 13 is insufficient to effect substantial outflow (broken line arrows, FIG. 4A) through port 13. Thus it is seen that this combination of fluid pressures shuts off fluid that normally would enter the valve at inlet port 12 and effectively reduces fluid leakage from the outlet port 13 of the valve by reversing the flow of the control fluid so that it leaves chamber 11 by way of inlet port 12.

The disclosed device is, therefore, a reverse flow vortex valve, whose operation is characterized in that at maximum main fluid flow turndown, or shut-off, control fluid flows from the valve inlet port rather than from the valve outlet port.

In testing a valve 10, "closed" valve leakage flow rates in the order of only 3 percent of the "open" valve mass flow rate have been achieved, as contrasted with a leakage flow rate of about 10 percent or more for a conventional vortex valve in which control flow is introduced tangentially at the outer periphery of the vortex chamber.

I have found that substantially zero leakage can be approached when working in a range of pressures where the ratio B of inlet pressure (Pos) to outlet pressure (Pe) does not exceed a value of about 5. In the event Pe is a vacuum, low leakage is best achieved by placing several of valves 10 in series fluid flow circuit.

Operation of a valve 10 embodying the invention will be further understood if it be first assumed that outlet port 13 is physically blocked, and the injection ports 15 and 16 energized, or turned on. I have found that if conditions are controlled so that control flow from each injection port is maintained at about Mach 1.6, for example, there is obtained a useful ratio of control port flow pressure (Pc) to inlet port stagnation pressure (Pos) of about 0.24. If most of this pressure were recovered, the ratio of Pc to Pos would be about 0.30, and the ratio B of inlet stagnation pressure (Pos) to the outlet or exit port pressure (Pe) sustained by the valve should be about 3.3. If the blockage of valve outlet port 13 is now replaced with a "surface" of constant pressure, the valve operation should be unaffected, and when the flow of control fluid through ports 15 and 16 is turned off, full flow will pass through valve 10.

In order to determine some optimum dimensions for elements of valve 10, and with specific reference to FIG. 1, I have taken into account the ratios $r_1/r_e$ and $r_c/r_{ea}$, where $r_1$ is the radius of the annular passage defined by the rim of disk 14 and chamber 11, $r_c$ is the radial distance of ports 15 and 16 from the axis, and $r_e$ is the radius of the outlet port 13.

The quantity of control fluid is a function of the area (Ac) of the control ports 15 and 16, and I have found that these ports should be as small as is consistent with good pressure recovery. Because the full flow rate depends primarily on the area (Ae) of outlet port 13, the ratio Ae/Ac is the physically significant parameter in determining the sizes of control ports 15, 16, and consequently the ratio (M) of maximum control mass flow rate to the valve open mass flow rate.

A measure of performance of a valve in accordance with my invention are the values of the parameters B, M, and Poc/Pos, and I have discovered that optimum values generally are achievable using, as a first approximation, the geometric ratios Ae/Ac=8, $r_c/r_e=2$, $r_1/r_c=2$ and $L/r_e=½$, which ratios determine the B, M, and Poc/Pos parameters, and where L is the axial distance of disk 14 from the planar wall in which are provided the injection ports 15, 16.

I claim:

1. In a vortex fluid amplifier valve of the type including a curved peripheral wall provided with end walls to define a vortex chamber, said end walls having axially aligned inlet and outlet ports, and means defining a disk in the vortex chamber, one side of said disk facing said inlet port and the other side of said disk facing said outlet port, the improvement comprising tangentially directed control-fluid injection port means located radially intermediate the axis and the peripheral curved wall of the chamber, in a region between said outlet port and the side of the disk facing the outlet port, said valve being effective to accommodate full flow of fluid into said inlet port, radially therefrom around the edges of said disk, and thence radially of the disk for flow through said outlet port, in the absence of control fluid flow from said injection port means, and said valve, upon flow of control fluid from said injection port means, serving to create a vortex on the outflow side of said disk to block flow of fluid outwardly from said outlet port.

2. A valve according to claim 1, and further characterized by the inclusion of means interposed in interference relation with fluid flowing in the region between said inlet port and the side of said disk facing said inlet port, and effective to impede vortical flow of such fluid in said region.

3. A valve according to claim 2 and further characterized in that said last recited means provide support of said disk in its recited orientation.

4. A valve according to claim 3 and further characterized in that said last recited means providing support of said disk comprises radially extending vanes interposed between the inlet port and the side of the disk facing the inlet port.

5. A valve according to claim 4, and further characterized in that said injection port means are positioned to direct control fluid with angularity to the confronting side of said disk.

6. A valve according to claim 1 and further characterized by the inclusion of radially extending vanes interposed between the inlet port and the side of the disk facing the inlet port.

7. A valve according to claim 6, and further characterized in that said injection ports are positioned to direct control fluid with angularity to the confronting side of the disk.

8. A reverse flow vortex valve comprising: a curved peripheral wall provided with end walls to define a vortex chamber; means defining axially aligned inlet and outlet ports in said end walls; means defining a disk disposed in said vortex chamber, one side of said disk facing said inlet port and the other side of said disk facing said outlet port; tangentially directed control-fluid injection port means disposed radially intermediate the axis and the peripheral curved wall of said chamber, in a region between said outlet port and the side of the disk facing said outlet port; and radially extending vane means interposed between said inlet port and the side of the disk facing the inlet port, introduction of control fluid through said injection port means being effective substantially to block flow of fluid through said valve and to effect discharge of control fluid substantially in a reverse direction through said inlet port.

9. A valve according to claim 8, and further characterized in that: said injection port means is located in a substantially planar wall of said chamber about one-half the distance between the axis of the valve and the curved wall of the chamber; the radius of the outlet port is equal to about one-half the distance of said injection port means from said axis; the axial distance of said disk from said planar wall is equal to about one-half the radius of said outlet port; and the cross-sectional area of said outlet port is about eight times the cross-sectional area of said injection port means.

10. A valve according to claim 9, and further characterized in that said injection port means is positioned to direct control fluid with angularity to the confronting side of said disk.

11. A valve according to claim 8 and further characterized in that said vanes provide support of said disk in its recited orientation.

* * * * *

PO-1050
(5/69)

UNITED STATES PATENT OFFICE
CERTIFICATE OF CORRECTION

Patent No. 3,712,321　　　　　　　　　Dated January 23, 1973

Inventor(s) ANDREW B. BAUER

It is certified that error appears in the above-identified patent and that said Letters Patent are hereby corrected as shown below:

Column 1, line 14, "valve-s" should read -- valve's -- ;

and

Column 3, line 41, "$r_c/r_{ea}$" should read -- $r_c/r_e$ -- .

Signed and sealed this 29th day of May 1973.

(SEAL)
Attest:

EDWARD M. FLETCHER, JR.　　　　　　ROBERT GOTTSCHALK
Attesting Officer　　　　　　　　　Commissioner of Patents